US008069301B2

(12) United States Patent
Fukutomi et al.

(10) Patent No.: US 8,069,301 B2
(45) Date of Patent: Nov. 29, 2011

(54) APPARATUS, STORAGE SYSTEM, AND COMPUTER PROGRAM PRODUCT FOR PREVENTION OF DATA LOSS

(75) Inventors: Kazuhiro Fukutomi, Kanagawa (JP); Hideaki Sato, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 331 days.

(21) Appl. No.: 12/393,654

(22) Filed: Feb. 26, 2009

(65) Prior Publication Data
US 2010/0005228 A1    Jan. 7, 2010

(30) Foreign Application Priority Data
Jul. 7, 2008    (JP) .................................. 2008-177410

(51) Int. Cl.
G06F 12/02    (2006.01)
(52) U.S. Cl. ........................... 711/103; 714/6.1; 714/6.2
(58) Field of Classification Search ................... 711/103
See application file for complete search history.

(56) References Cited

U.S. PATENT DOCUMENTS

| 7,496,811 | B2 | 2/2009 | Kanno |
| 7,865,761 | B1 * | 1/2011 | Chilton ............................. 714/2 |
| 2007/0130496 | A1 | 6/2007 | Kanno |
| 2007/0174740 | A1 | 7/2007 | Kanno |
| 2008/0205145 | A1 | 8/2008 | Kanno et al. |
| 2008/0276038 | A1 * | 11/2008 | Tanaka et al. ................. 711/103 |

FOREIGN PATENT DOCUMENTS
JP    2008-40713    2/2008

OTHER PUBLICATIONS

U.S. Appl. No. 12/396,006, filed Mar. 2, 2009, Sato, et al.
U.S. Appl. No. 12/395,811, filed Mar. 2, 2009, Fukutomi, et al.
U.S. Appl. No. 12/398,608, filed Mar. 5, 2009, Fukutomi, et al.
U.S. Appl. No. 12/400,863, filed Mar. 10, 2009, Kanno.
U.S. Appl. No. 12/404,861, filed Mar. 16, 2009, Kanno, et al.
U.S. Appl. No. 12/713,631, filed Feb. 26, 2010, Fukutomi, et al.
U.S. Appl. No. 12/513,860, filed May 7, 2009, Nagadomi, et al.
U.S. Appl. No. 12/555,274, filed Sep. 8, 2009, Kanno, et al.
U.S. Appl. No. 12/566,236, filed Sep. 24, 2009, Yano, et al.
U.S. Appl. No. 12/883,796, filed Sep. 16, 2010, Fukutomi, et al.
David A. Patterson et al., A Case for Redundant Arrays of Inexpensive Disks (RAID), Computer Science Division Department of Electrical Engineering and Computer Sciences, Proceedings of the 1988 ACM SIGMOD, 1988, pp. 109-116.

* cited by examiner

*Primary Examiner* — Sanjiv Shah
*Assistant Examiner* — Daniel Tsui
(74) *Attorney, Agent, or Firm* — Oblon, Spivak, McClelland, Maier & Neustadt, L.L.P.

(57) ABSTRACT

A data control apparatus includes a mapping-table managing unit that manages a mapping table that is associated with a corrupted-data recovery function of recording data and error correcting code data as redundant data that is given separately from the data, distributed and stored in units of stripe blocks in the plural nonvolatile semiconductor memory devices, the mapping table containing arrangement information of the data and the error correcting code data; a determining unit that determines whether to differentiate frequencies of writing the data into the semiconductor memory devices; and a changing unit that changes the arrangement information by switching the data stored in units of the stripe blocks managed using the mapping table to differentiate the frequencies of writing the data into the semiconductor memory devices, when the determining unit determines that the frequencies of writing the data into the semiconductor memory devices are to be differentiated.

12 Claims, 16 Drawing Sheets

FIG.7

| STRIPE BLOCK | DRIVE | SERIAL NUMBER OF POSITIONS IN DRIVE (IN UNITS OF STRIPE BLOCKS) |
|---|---|---|
| 0 | 0 | 0 |
| 1 | 1 | 0 |
| 2 | 2 | 0 |
| PARITY P1 | 3 | 0 |
| 3 | 3 | 1 |
| 4 | 0 | 1 |
| 5 | 1 | 1 |
| PARITY P2 | 2 | 1 |
| 6 | 2 | 2 |
| 7 | 3 | 2 |
| 8 | 0 | 2 |
| PARITY P3 | 1 | 2 |
| 9 | 1 | 3 |
| 10 | 2 | 3 |
| 11 | 3 | 3 |
| PARITY P4 | 0 | 3 |

FIG.8

| STRIPE BLOCK | NUMBER OF WRITINGS |
|---|---|
| 0 | 500 |
| 1 | 100 |
| 2 | 10 |
| PARITY 0 | 610 |
| 3 | 60 |
| 4 | 50 |
| 5 | 70 |
| PARITY 1 | 180 |
| 6 | 800 |
| 7 | 600 |
| 8 | 200 |
| PARITY 2 | 1600 |

FIG.9

| DRIVE | NUMBER OF WRITINGS |
|---|---|
| 0 | 450 |
| 1 | 400 |
| 2 | 500 |
| 3 | 470 |

FIG.14A

DIFFERENCE IN LIFE EXPECTANCY BECOMES LOWER THAN PREDETERMINED THRESHOLD VALUE

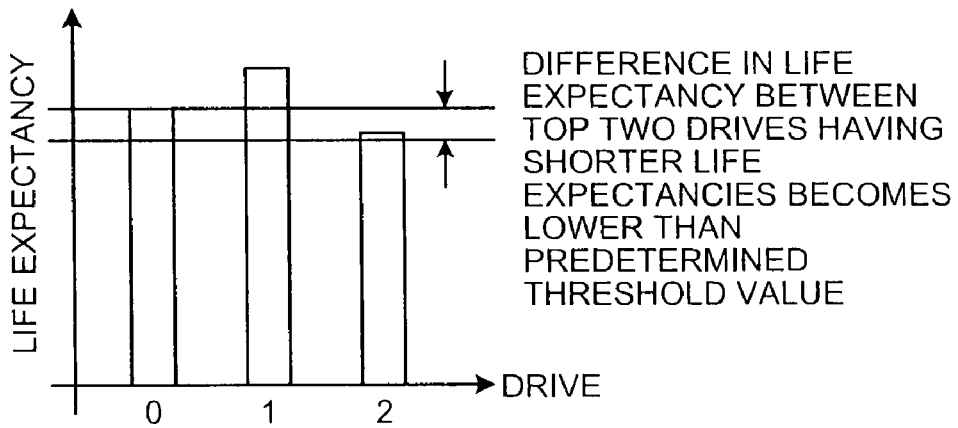

DIFFERENCE IN LIFE EXPECTANCY BETWEEN TOP TWO DRIVES HAVING SHORTER LIFE EXPECTANCIES BECOMES LOWER THAN PREDETERMINED THRESHOLD VALUE

FIG.14B

DRIVES ARE OPERATED FOR PREDETERMINED TIME PERIOD AFTER DIFFERENTIATING WRITING FREQUENCIES

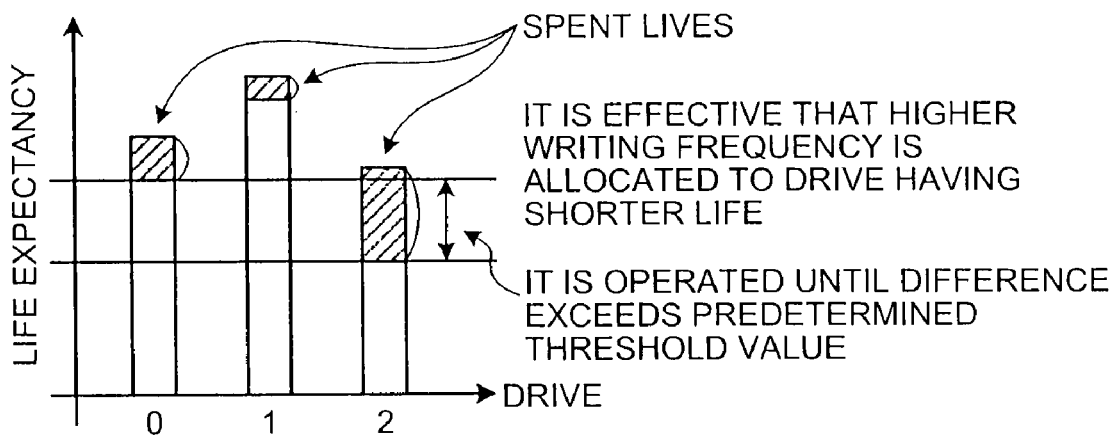

SPENT LIVES

IT IS EFFECTIVE THAT HIGHER WRITING FREQUENCY IS ALLOCATED TO DRIVE HAVING SHORTER LIFE

IT IS OPERATED UNTIL DIFFERENCE EXCEEDS PREDETERMINED THRESHOLD VALUE

APPARATUS, STORAGE SYSTEM, AND COMPUTER PROGRAM PRODUCT FOR PREVENTION OF DATA LOSS

CROSS-REFERENCE TO RELATED APPLICATIONS

This application is based upon and claims the benefit of priority from the prior Japanese Patent Application No. 2008-177410, filed on Jul. 7, 2008; the entire contents of which are incorporated herein by reference.

BACKGROUND OF THE INVENTION

1. Field of the Invention

The present invention relates to a data control apparatus, a storage system, and a computer program product.

2. Description of the Related Art

Recently, a NAND (not AND) flash memory is being widely used as a type of storage media. The NAND flash memory is a nonvolatile memory capable of holding information even when power supply is stopped.

Because the NAND flash memory has an increased capacity and a higher integration, influences of secular change of data written in the memory, or read disturbance, which is data corruption resulting from a reading process, become significant. Accordingly, the data stored in the memory can be degraded, which increases the possibility that the stored data cannot be reproduced correctly. The secular change is a phenomenon in which an error occurs in data due to gradual discharge with time from a floating gate having charges accumulated therein. The read disturbance is a phenomenon in which an error occurs in the stored data due to slight charges that are accumulated in a floating gate of a memory cell adjacent to a memory cell from which the data is read.

In the NAND flash memory, to solve the problems of the secular change and the read disturbance, an error correcting code that enables to correct an error occurring in data is applied, thereby restoring correct data.

In addition, in the NAND flash memory, a refresh process of rewriting data in the NAND flash memory after the error correction is performed. Accordingly, it is possible to prevent data stored in the NAND flash memory from being completely damaged, and to increase a data retention period.

In the NAND flash memory, when data are concentrically written or erased only in/from a specific block, only this block reaches the end of its operating life earlier. Therefore, wear leveling is performed to convert address signals from outside into different addresses in a chip, so that the numbers of writings/erasures into/from blocks are averaged.

Recently, a NAND flash memory having the same connection interface standard as that of a hard disk drive (HDD) (AT attachment (ATA) standard) has been developed, and is called "solid state drive (SSD)". The SSD has a data reading performance higher than the HDD, and has a low-power-consumption and impact-resistant property.

Meanwhile, in a storage system such as a disk array applied in a server environment, redundant arrays of independent/inexpensive disks (RAID) in which plural memory devices are connected are usually arranged to improve reliability, as described in "A Case for Redundant Arrays of Inexpensive Disks (RAID), D. Patterson, G. Gibson, and R. Katz., Proceedings of the 1998 ACM SIGMOD, pp. 109-116, June 1988". For example, in RAID 5, a memory device assigned to store an error correcting code called "parity" and memory devices assigned to store data are arranged with the positions being changed by turns in each stripe. Accordingly, even when a specific memory device fails and then data cannot be read therefrom, the data stored in the faulty memory device can be recovered from data stored in the remaining memory devices. In a disk array device that implements the RAID function, it is possible to enhance fault tolerance, increase the capacity, and speed up the reading process. Further, when read/write requests are distributed over the memory devices in units called "stripe blocks", loads on the memory devices can be distributed. It is expected that such load distribution equalizes accesses to the memory devices.

The RAID can be configured also when a secondary memory is configured by the SSD, instead of the HDD.

However, when the secondary memory is configured by the SSD instead of the HDD and when the RAID is configured, there is a high possibility that the numbers of writings/erasures are smoothed by the wear leveling in the SSDs, and that the numbers of writings into the SSDs can be equalized by the load distribution according to the RAID function. Therefore, the risk that the plural SSDs may fail around the same time is increased. If the SSDs configuring the RAID fail around the same time, a replacement or maintenance operation becomes difficult, and thus the risk of data loss arises.

SUMMARY OF THE INVENTION

According to one aspect of the present invention, a data control apparatus includes a mapping-table managing unit that manages a mapping table that is contained arrangement information of data and error correcting code data as redundant data that is given separately from the data, distributed and stored in units of stripe blocks in the plural nonvolatile semiconductor memory devices; a determining unit that determines whether to differentiate frequencies of writing the data into the semiconductor memory devices; and a changing unit that changes the arrangement information by switching the data stored in units of the stripe blocks managed using the mapping table to differentiate the frequencies of writing the data into the semiconductor memory devices, when the determining unit determines that the frequencies of writing the data into the semiconductor memory devices are to be differentiated.

According to another aspect of the present invention, a storage system includes plural nonvolatile semiconductor memory devices; and the data control apparatus according to the one aspect of the present invention.

According to still another aspect of the present invention, a computer program product having a computer readable medium including programmed instructions for controlling data, wherein the instructions, when executed by a computer, cause the computer to perform: managing a mapping table that is contained arrangement information of data and error correcting code data as redundant data that is given separately from the data, distributed and stored in units of stripe blocks in the plural nonvolatile semiconductor memory devices; determining whether to differentiate frequencies of writing the data into the semiconductor memory devices; and changing the arrangement information by switching the data stored in units of the stripe blocks managed using the mapping table to differentiate the frequencies of writing the data into the semiconductor memory devices, when it is determined that the frequencies of writing the data into the semiconductor memory devices are to be differentiated.

BRIEF DESCRIPTION OF THE DRAWINGS

FIG. 7 is a schematic diagram for explaining an example of a stripe mapping table;

FIG. 8 is a schematic diagram for explaining an example of a table of measured numbers of writings in units of stripe blocks;

FIG. 9 is a schematic diagram for explaining an example of a table of a measured number of writings into each of drives;

FIGS. 14A to 14B are schematic diagrams for explaining a second method of differentiating writing frequencies;

DETAILED DESCRIPTION OF THE INVENTION

Exemplary embodiments of a data control apparatus, a storage system, and a computer program product according to the present invention will be explained below in detail with reference to the accompanying drawings. The present invention is not limited to the following descriptions and various changes can be appropriately made without departing from the scope of the invention.

Figure 1:
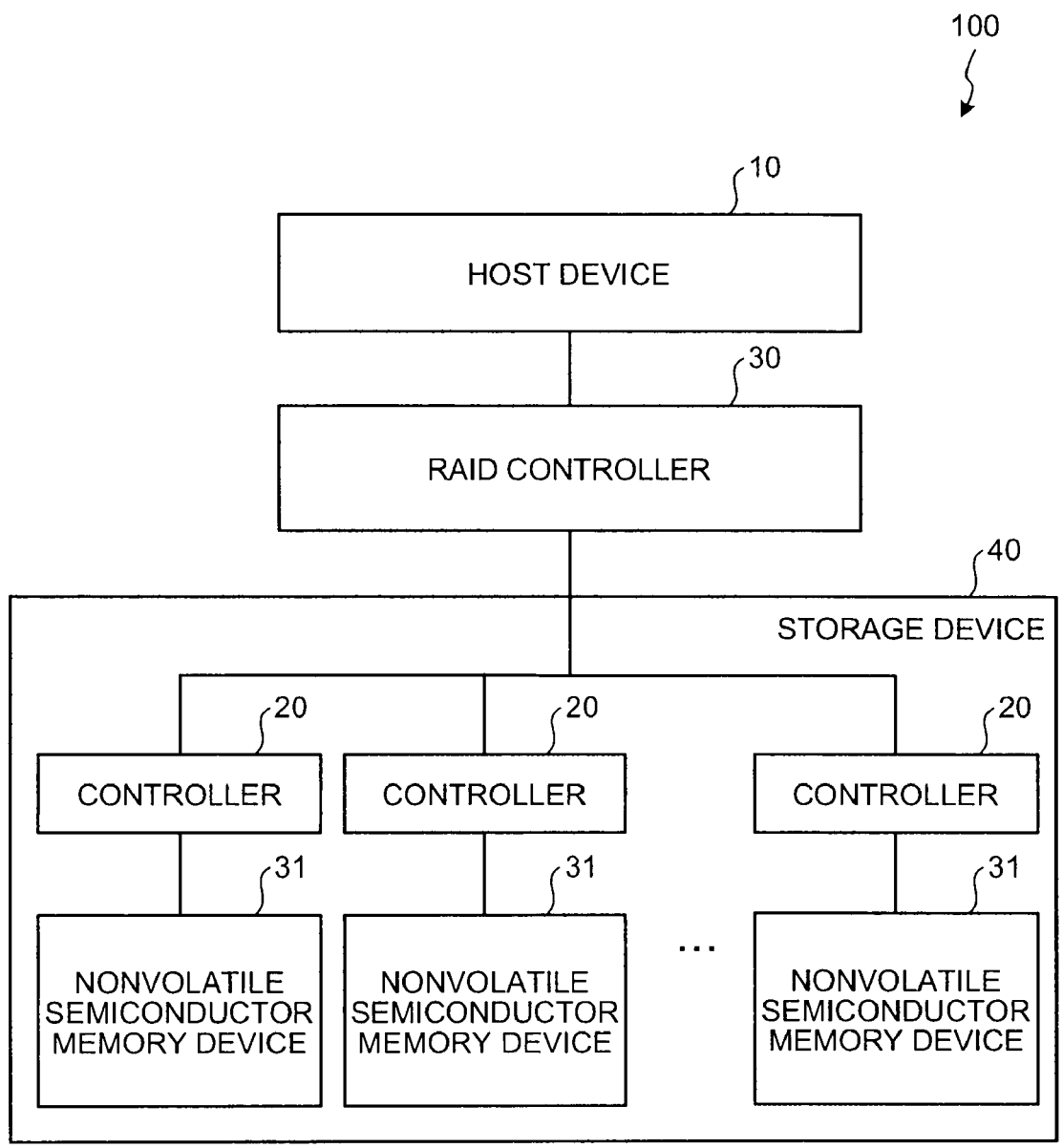
FIG. 1 is a block diagram of a schematic configuration of a storage system according to an embodiment of the present invention.

An embodiment of the present invention is explained with reference to FIGS. 1 to 20. FIG. 1 is a block diagram of a schematic configuration of a storage system 100 according to the embodiment. As shown in FIG. 1, the storage system 100 includes a host device 10 such as a personal computer (PC), a RAID controller 30 as a data control apparatus, and a storage device 40. The storage device 40 includes plural pairs of a controller 20 that controls accesses to memory elements and a nonvolatile semiconductor memory device 31. In FIG. 1, the controller 20 and the nonvolatile semiconductor memory device 31 are provided as separate components; however, each of the controllers 20 can be incorporated in the nonvolatile semiconductor memory device 31.

The host device 10 outputs instruction information for requesting the controller 20 to write or read data, via the RAID controller 30. The instruction information for requesting writing of data is hereinafter referred to as "write request", and the instruction information for requesting reading of data is referred to as "read request". It is assumed here that the write request outputted from the host device 10 to the controller 20 via the RAID controller 30 includes at least data to be written (write target data). It is also assumed that the read request includes address information (for example, logical block addressing (LBA)) of the plural nonvolatile semiconductor memory devices 31 as read sources.

The nonvolatile semiconductor memory device 31 is a storage medium utilizing a nonvolatile semiconductor device. The SSD, which is a NAND flash memory (nonvolatile semiconductor device) having the same connection interface standard (ATA standard) as that of the HDD is an example thereof. In the present embodiment, the SSD is used as the nonvolatile semiconductor memory device as an example; however, the nonvolatile semiconductor memory device is not limited to the SSD.

The RAID controller 30 is a data recovery apparatus in a storage system configured by the RAID having fault tolerance and redundancy, built in a PC or the like. The RAID controller 30 manages the plural nonvolatile semiconductor memory devices 31 using the RAID technique that enables to avoid data corruption, and performs writing or reading of data into or from storage areas that are logically formed by the plural nonvolatile semiconductor memory devices 31, in response to a request from the host device 10.

More specifically, the plural nonvolatile semiconductor memory devices 31 have an arrangement according to either RAID 5 or 6 or combination thereof, and therefore the RAID controller 30 achieves fault tolerance and redundancy of the plural nonvolatile semiconductor memory devices 31. A mode in which the plural nonvolatile semiconductor memory devices 31 have an arrangement according to the RAID 5 is explained below in the present embodiment.

In the RAID 5, a memory device assigned to store an error correcting code called "parity" and memory devices assigned to store data are arranged with the positions being changed by turns in each stripe. A disk array device that implements the RAID 5 can achieve increased fault tolerance, an increased capacity, and speed-up of the reading process.

Figure 2:
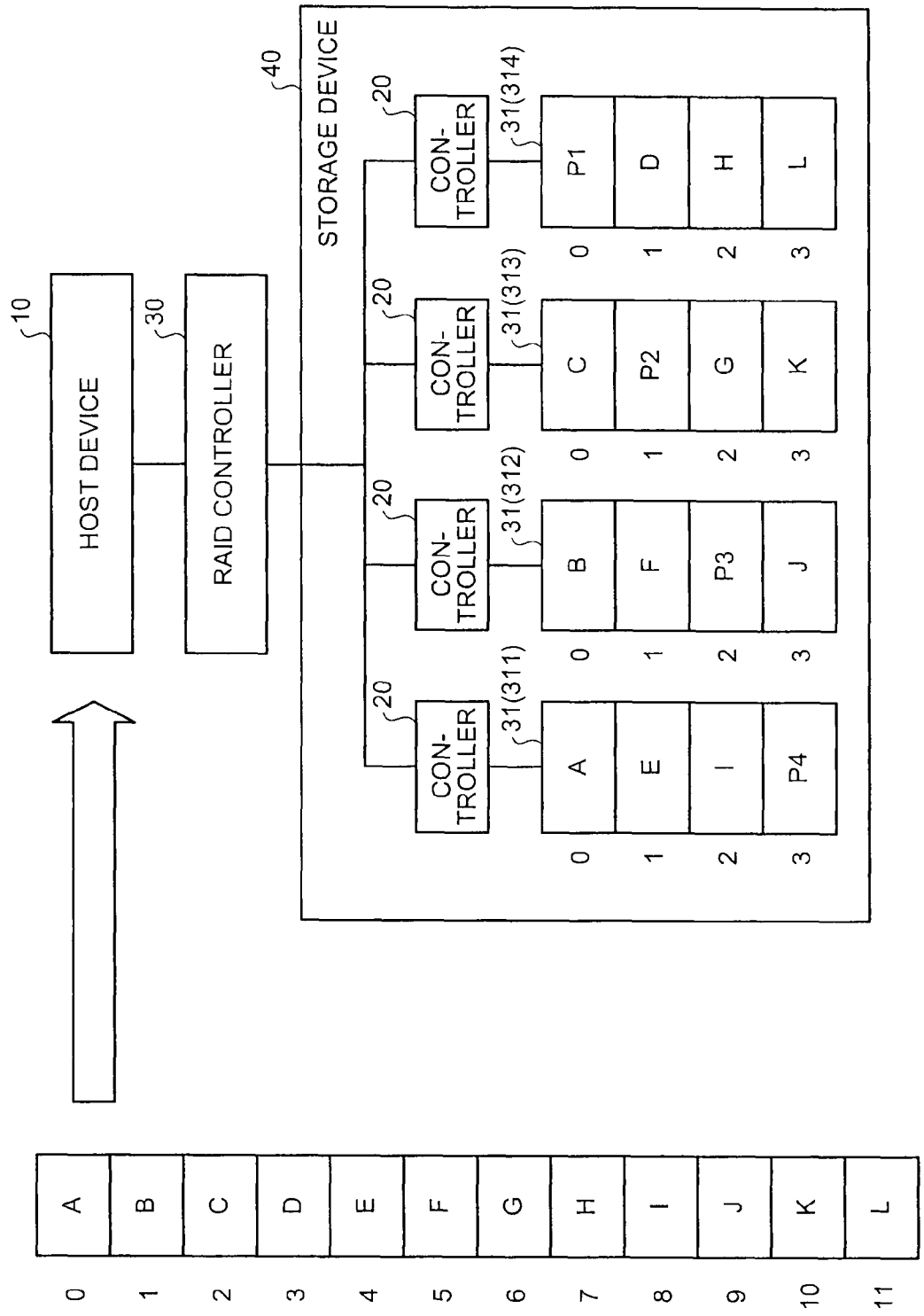
FIG. 2 is a schematic diagram for explaining storage areas of plural nonvolatile semiconductor memory devices arranged according to the RAID 5.

FIG. 2 is a schematic diagram for explaining storage areas of the plural nonvolatile semiconductor memory devices 31 arranged according to the RAID 5. FIG. 2 depicts an example in which four nonvolatile semiconductor memory devices 31 (nonvolatile semiconductor memory devices 311 to 314) are arranged, and shows statuses of 12 pieces of data A to L stored in the storage areas of the plural nonvolatile semiconductor memory devices 31.

The storage areas of the nonvolatile semiconductor memory devices 31 configuring the RAID 5 are divided by the controllers 20 into plural logical blocks as units for data writing or reading. In the example shown in FIG. 2, an area in which each of the data A to L or each of parities P1 to P4 is stored corresponds to one logical block.

The parities P1 to P4 are recovery information calculated from plural pieces of data in the same stripe area (0 to 3). Data in the same stripe area can be recovered based on the recovery information. For example, the parity P1 is generated from the data A, B, and C that belong to a strip 0 (zero). By using the parity P1, when an error occurs in any one of the data A, B, and C, the data in which the error occurs can be recovered from the remaining data and the parity P1. It is assumed here that logical blocks storing therein the data and a logical block storing therein a parity (hereinafter, "parity area") are determined according to a predetermined rule. Arrangement positions thereof are not limited to those of the example shown in FIG. 2.

The plural nonvolatile semiconductor memory devices 31 store therein data under a RAID management by the RAID controller 30. The number of the nonvolatile semiconductor memory devices 31 is not particularly limited as long as the number meets the requirements of the RAID used by the RAID controller 30 (for example, three or more in the case of the RAID 5).

Figure 3:
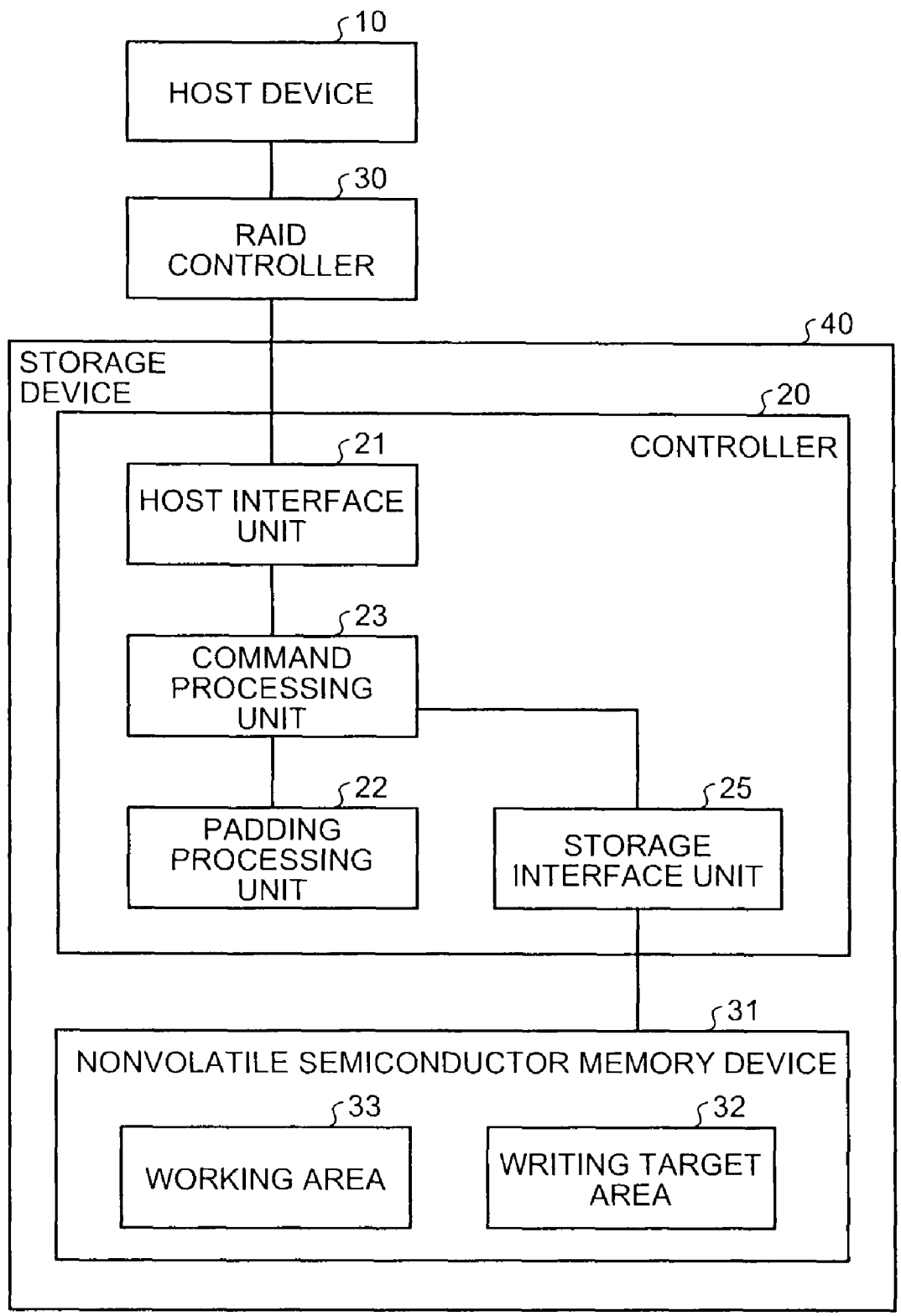
FIG. 3 is a block diagram of a detailed configuration of a storage device.
Figure 4:
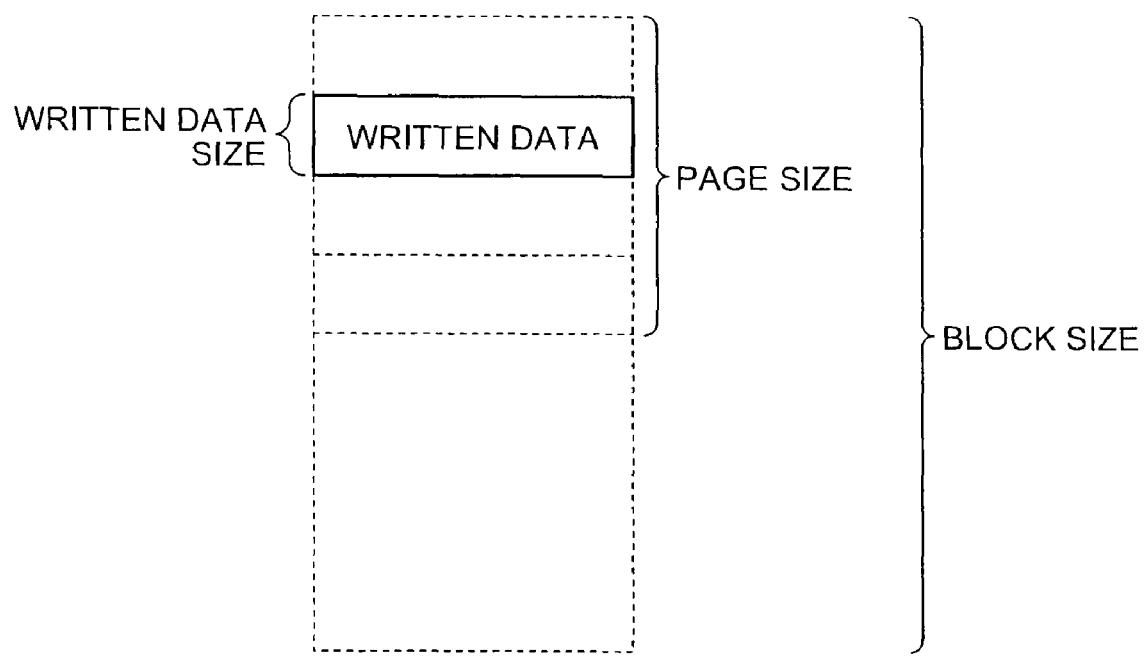
FIG. 4 is a schematic diagram illustrating a size of write request.

A configuration of the storage device 40, and a process performed thereby are explained in detail with reference to FIG. 3. FIG. 3 is a block diagram of a detailed configuration of the storage device 40. The controller 20 of the storage device 40 includes processors such as an application specific integrated circuit (ASIC) and a central processing unit (CPU), and memories such as a read only memory (ROM) that stores therein predetermined programs for controlling an operation of the controller 20, and a random access memory (RAM) as a working area of the processor (all not shown). As shown in FIG. 3, the controller 20 realizes functional units including a host interface unit 21, a padding processing unit 22, a command processing unit 23, and a storage interface unit 25 in cooperation with the processor and the programs stored in the memory.

The host interface unit 21 is an interface device for connecting to the host device 10 (the RAID controller 30), and controls transmission and reception of a command between the host device 10 (the RAID controller 30) and the controller 20 (the command processing unit 23).

The storage interface unit 25 is an interface device for connecting to the nonvolatile semiconductor memory device 31, and controls transmission and reception of a command between the nonvolatile semiconductor memory device 31 and the controller 20 (the command processing unit 23).

The command processing unit 23 writes or reads data into/from the nonvolatile semiconductor memory device 31 via the storage interface unit 25 in response to a request from the host device 10, which is inputted via the host interface unit 21. Particularly, the command processing unit 23 writes data in the nonvolatile semiconductor memory device 31 after a padding process is performed by the padding processing unit 22.

The padding processing unit 22 performs a following padding process when the nonvolatile semiconductor memory device 31 as the SSD is used. The padding process is a process of adapting a write request for data (of a sector size) (see FIG. 4) from the host device 10, which becomes smaller than a block size or a page size of the SSD because the SSD has the same connection interface standard (ATA standard) as that of the HDD, to the block size or the page size of the SSD, and writing the data in the SSD.

Figure 5A:
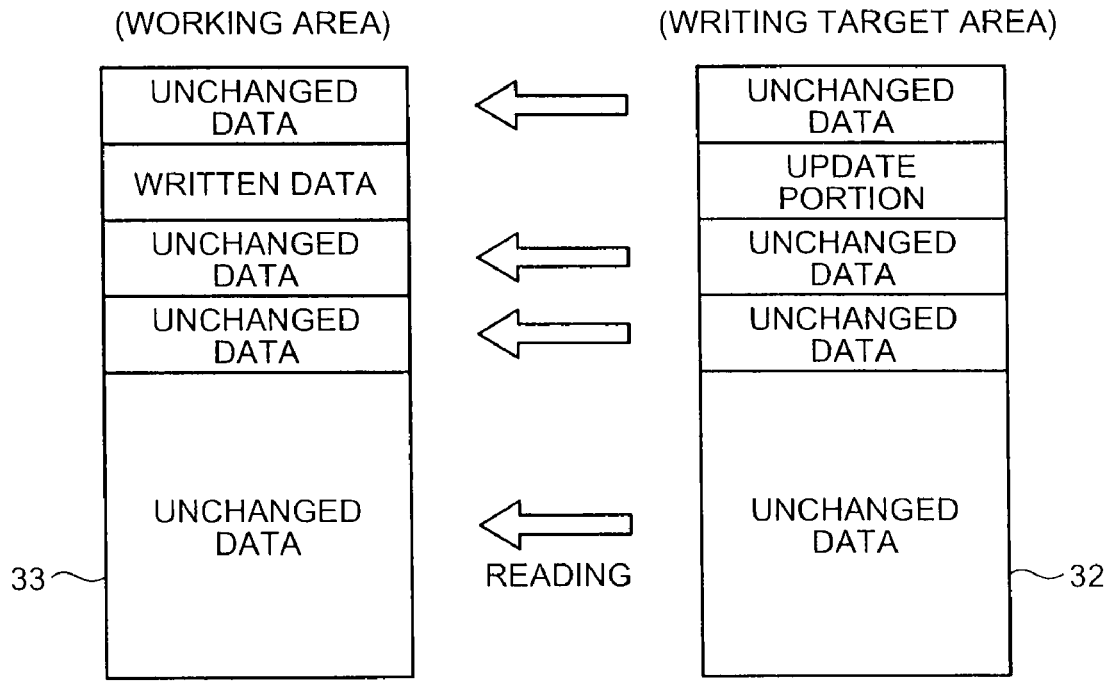
FIGS. 5A and 5B are schematic diagrams for explaining a data writing process including a padding process.
Figure 5B:
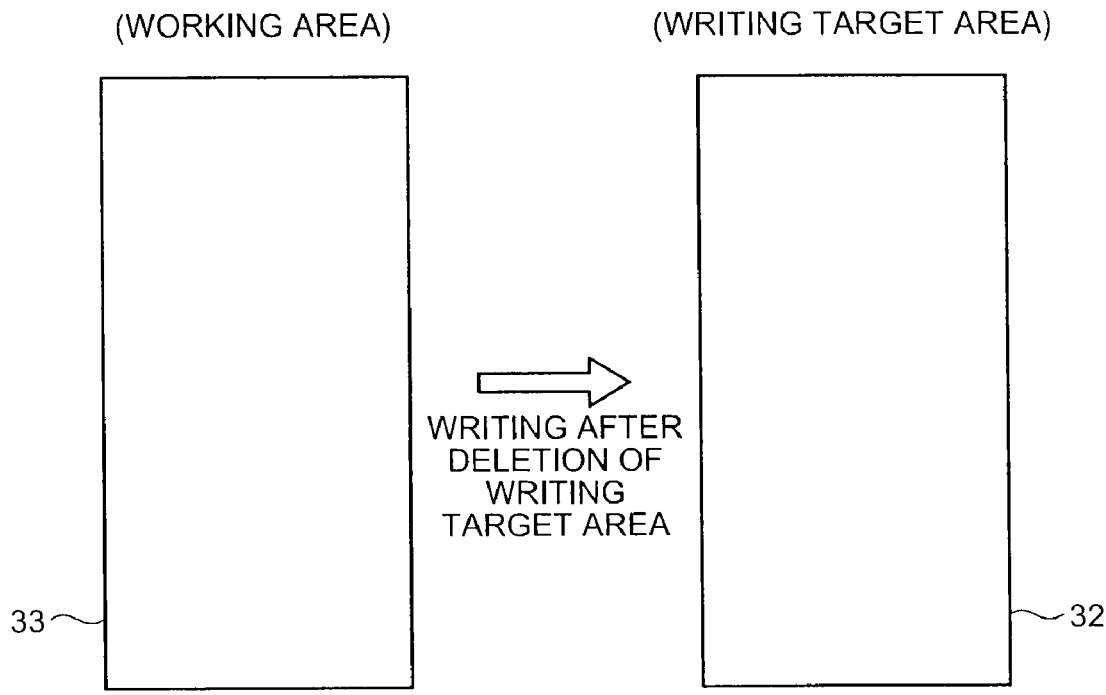

FIGS. 5A and 5B are schematic diagrams for explaining a data writing process including the padding process. As shown in FIGS. 5A and 5B, when a write request for data of a size (sector size) smaller than the block size or the page size of the SSD is transmitted from the host device 10 to the nonvolatile semiconductor memory device 31 as the SSD, the data requested to write is stored in a working area 33 in the nonvolatile semiconductor memory device 31 as the SSD. At the same time, data of unchanged portions in a writing target area 32 of the nonvolatile semiconductor memory device 31 as the SSD, other than an update portion corresponding to the writing request are read as padding data, then stored in the working area 33 together with the data requested to write, and then the padding process is terminated (FIG. 5A). After a deleting process is performed for the writing target area 32, the data (the data requested to write and the padding data) in the working area 33 are written in the writing target area 32 (FIG. 5B). Accordingly, the write request for data (of the sector size) from the host device 10, smaller than the block size or the page size of the SSD can be adapted to the block size or the page size of the SSD.

When the nonvolatile semiconductor element that configures the SSD is a NAND flash memory, data in a storage cell may be corrupted due to the secular change of written data or the read disturbance as data corruption resulting from the reading process. Usually, in a memory device that applies the NAND flash memory as a storage medium, correct data can be recovered from corrupted data by using an error correcting code.

Figure 6:
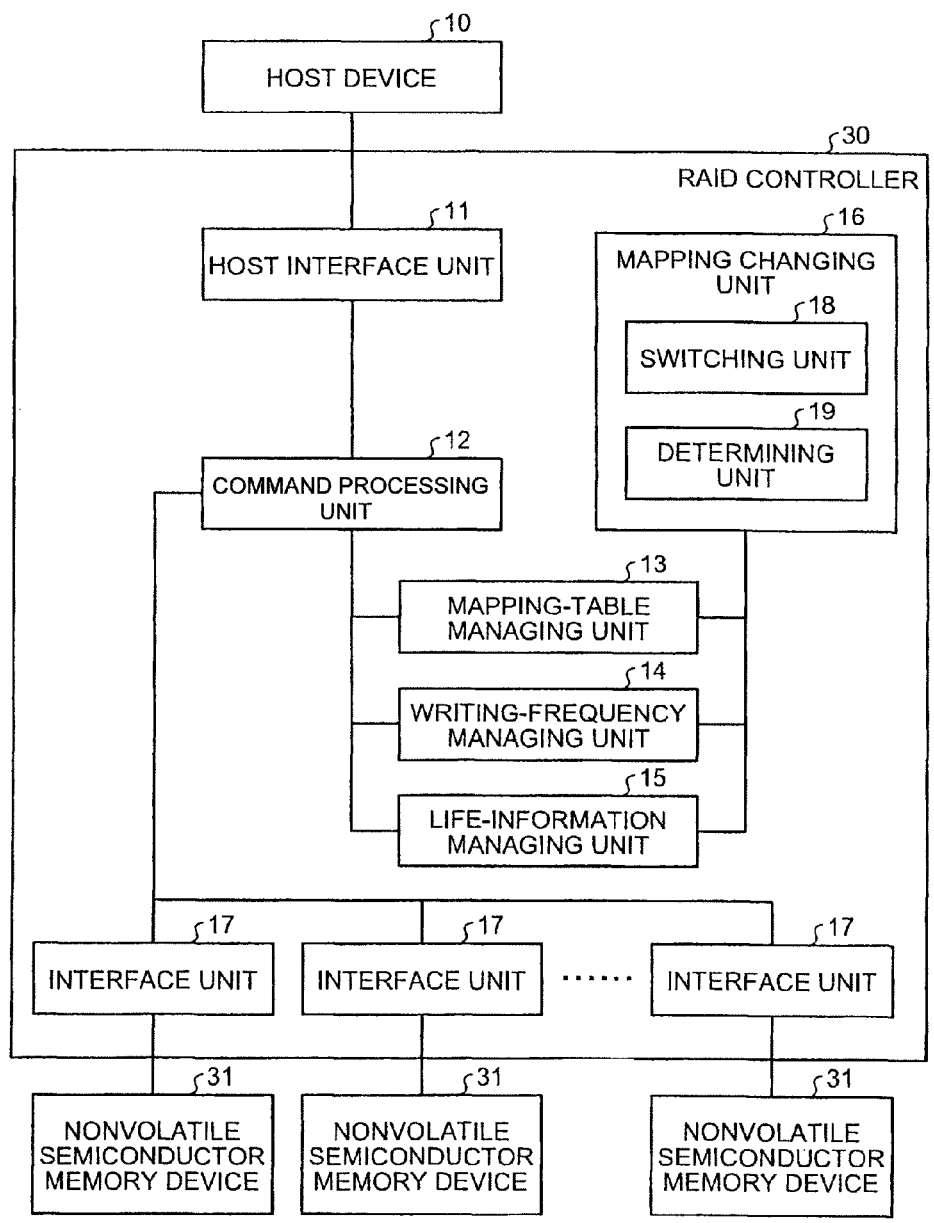
FIG. 6 is a block diagram of a detailed configuration of a RAID controller.

A configuration of the RAID controller 30 and a process performed thereby are explained in detail with reference to FIG. 6. FIG. 6 is a block diagram of a detailed configuration of the RAID controller 30. As the RAID controller 30 shown in FIG. 6, a RAID controller in a storage system configured by the RAID having fault tolerance and redundancy is assumed. Even when the plural nonvolatile semiconductor memory devices 31 as described above are connected to the RAID controller 30, and a specific one of the nonvolatile semiconductor memory devices 31 fails so that reading of data cannot be performed, the RAID controller 30 can recover data stored in the faulty nonvolatile semiconductor memory device 31, from data stored in the remaining nonvolatile semiconductor memory devices 31.

The RAID controller 30 includes processors such as an ASIC, and a CPU, and memories such as a ROM that stores therein predetermined programs for controlling the operation of the RAID controller 30, and a RAM as a working area of the processor (all not shown). As shown in FIG. 6, the RAID controller 30 realizes functional units including a host interface unit 11, a command processing unit 12, a mapping-table managing unit 13, a writing-frequency managing unit 14, a life-information managing unit 15, a mapping changing unit 16, and interface units 17, in cooperation with the processor and the programs stored in the memory.

The host interface unit 11 receives a command from the host device 10, or returns a response to the command to the host device 10.

The command processing unit 12 processes the command received from the host device 10. In processing the command received from the host device 10, the command processing unit 12 issues a necessary command to each of the nonvolatile semiconductor memory devices 31 in the storage device 40, based on mapping information in the mapping-table managing unit 13. The command processing unit 12 transmits writing execution information to the writing-frequency managing unit 14 and the life-information managing unit 15.

The mapping-table managing unit 13 manages a stripe mapping table. FIG. 7 is a schematic diagram for explaining an example of the stripe mapping table. The example of the stripe mapping table shown in FIG. 7 has correspondence relations with the stripe blocks shown in FIG. 2. The stripe mapping table stores therein arrangement information of data and error correcting code data associated with a corrupted-data recovering function of recording the data and the error correcting code data to be distributed and stored in units of stripe blocks in the plural nonvolatile semiconductor memory devices 31.

The stripe mapping table can be stored in a nonvolatile storage area in the RAID controller 30. Alternatively, the stripe mapping table can be stored in a given area of the nonvolatile semiconductor memory device 31, so that the RAID controller 30 reads the table at the time of start-up of the storage system 100.

The writing-frequency managing unit 14 manages information of a write frequency of each stripe block. For example, an example of an index used to calculate a write frequency is the number of writings to each stripe block. FIG. 8 is a schematic diagram for explaining an example of a table of measured numbers of writings in units of stripe blocks (hereinafter also "measured-writing-times table"). The table of measured numbers of writings in units of stripe blocks shown in FIG. 8 is a writing information table when the number of writings is adopted as information used to calculate the write frequency. The table of measured numbers of writings in units of stripe blocks shown in FIG. 8 indicates that writing of a stripe block 6 has occurred 800 times, for example.

The table of measured numbers of writings in units of stripe blocks can be used as a criterion for switching of stripe blocks by the mapping changing unit 16, which is explained later. Because an access pattern up to a measurement time can be known, by using the measured-writing-times table, it is possible to know how much the writing frequency is changed by switching which stripe blocks. Because a stripe block having a dominant number of writings can be known, by using the measured-writing-times table, it is possible know which stripe blocks to be switched to efficiently change the writing frequency.

The table of measured numbers of writings in units of stripe blocks can be stored in a nonvolatile storage area in the RAID controller 30, like the stripe mapping table as mentioned above. Alternatively, the measured-writing-times table can be stored in a given area of the nonvolatile semiconductor memory device 31, so that the RAID controller 30 reads the table at the time of start-up of the storage system 100.

The life-information managing unit 15 manages information of a residual life of each of the nonvolatile semiconductor memory devices 31. An example of an index used to calculate the residual life is the number of writings into each of the nonvolatile semiconductor memory devices 31 (drives). FIG. 9 is a schematic diagram for explaining an example of a table of a measured number of writings into each of the drives. The table of a measured number of writings into each of the nonvolatile semiconductor memory devices 31 (drives) shown in FIG. 9 is an information table when the number of writings is adopted as information to be used to calculate a residual life. The table of a measured number of writings into each of the nonvolatile semiconductor memory devices 31 (drives) shown in FIG. 9 contains how many times of writing have been performed to each of the nonvolatile semiconductor memory devices 31 (drives), and therefore can be used as a criterion for allocation of the write frequency. For example, a higher write frequency can be allocated to a drive having a larger number of writings performed thereto.

The table of a measured number of writings into each of the drives can be stored in a nonvolatile storage area in the RAID controller 30, like the stripe mapping table as mentioned above. Alternatively, the table can be stored in a given area of the nonvolatile semiconductor memory device 31, to be read by the RAID controller 30 at the time of start-up of the storage system 100. When the information required to calculate the residual life (such as the number of writings) can be directly obtained from self-monitoring, analysis and reporting technology (SMART) information of each of the nonvolatile semiconductor memory devices 31 or the like, there is no need to store the table in the nonvolatile storage area of the RAID controller 30.

The mapping changing unit 16 performs a process of changing mapping (arrangement information). The mapping changing unit 16 includes a switching unit 18. The switching unit 18 performs a process of switching data stored in units of stripe blocks when mapping is to be changed. The mapping changing unit 16 further includes a determining unit 19. The determining unit 19 determines whether to differentiate frequencies of data writing into the nonvolatile semiconductor memory devices 31 (drives).

The interface unit 17 is an interface device for connecting to the controller 20 of the storage device 40. The interface unit 17 controls transmission and reception of a command between the controller 20 and the RAID controller 30.

Figure 10:
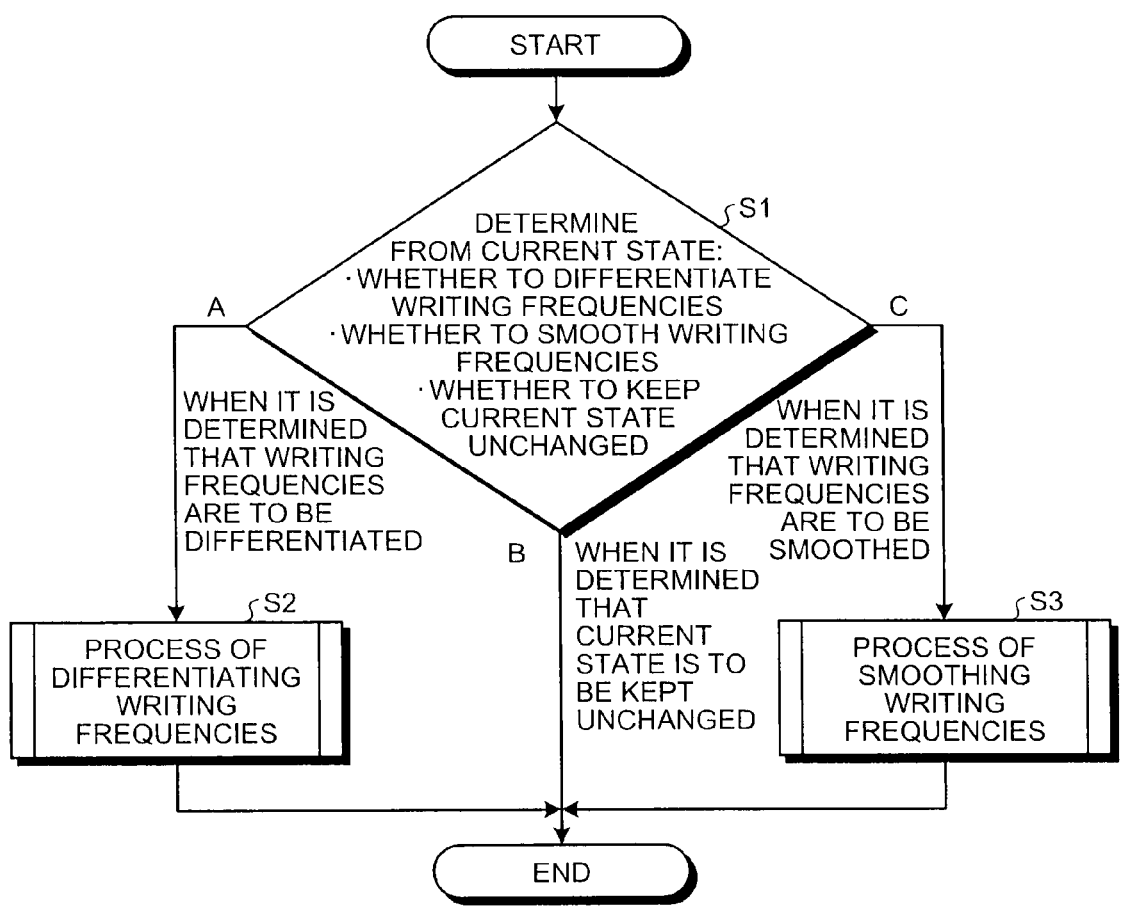
FIG. 10 is a flowchart for schematically explaining a mapping changing process.
Figure 11A:
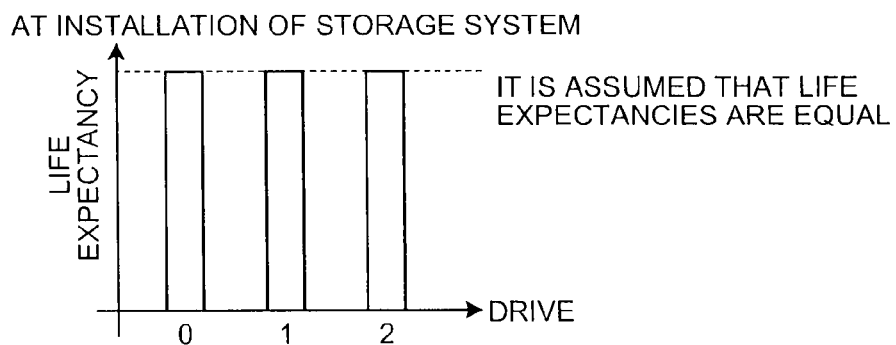
FIGS. 11A to 11D are schematic diagrams for explaining a first method of differentiating writing frequencies.
Figure 11B:
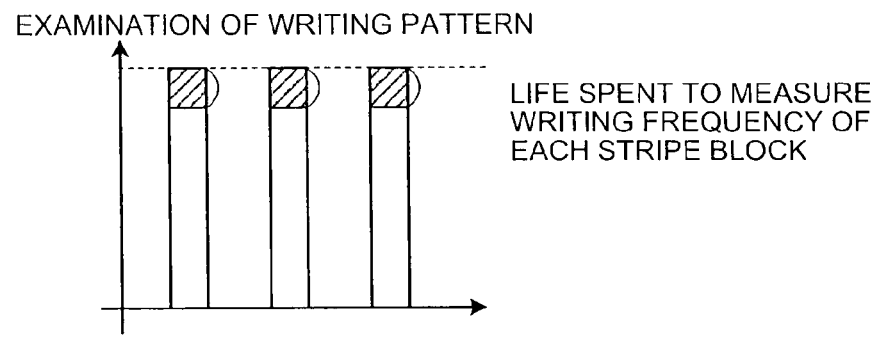
Figure 11C:
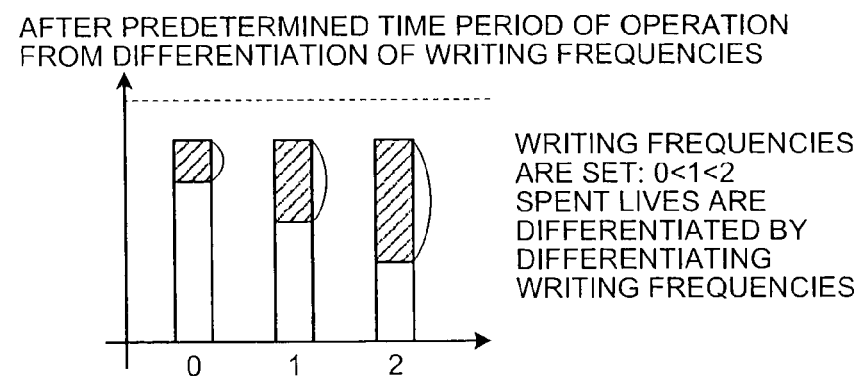
Figure 11D:
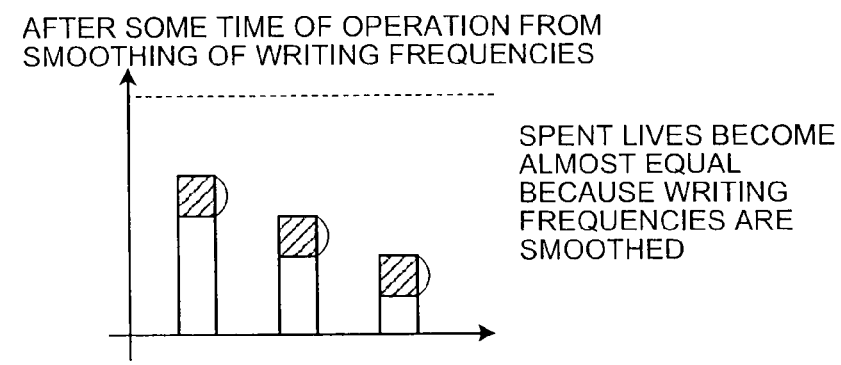

A flow of a mapping changing process performed by the RAID controller 30 is explained. FIG. 10 is a flowchart for schematically explaining the mapping changing process. As shown in FIG. 10, when the process is started automatically or manually at arbitrary timing, or according to scheduling that causes the process to be executed periodically, the determining unit 19 of the mapping changing unit 16 determines from the current state:
whether to differentiate frequencies of writing into the nonvolatile semiconductor memory devices 31;
whether to smooth the frequencies of writing into the nonvolatile semiconductor memory devices 31; and
whether to keep the frequencies unchanged (Step S1).

The residual life of each of the nonvolatile semiconductor memory devices 31, which can be determined from the table of a measured number of writings into each of the drives as shown in FIG. 9, the writing frequency of each stripe block, which can be calculated from the table of measured numbers of writings in units of stripe blocks as shown in FIG. 8, and the current frequency of writing into each of the nonvolatile semiconductor memory devices 31 can be used as indices to determine the current state. The current frequency of writing into each of the nonvolatile semiconductor memory devices 31 can be calculated from the stripe mapping table shown in FIG. 7 and the writing frequency of each stripe block.

When it is determined that the frequencies of writing into the nonvolatile semiconductor memory devices 31 are to be differentiated, it implies that the plural nonvolatile semiconductor memory devices 31 are within a threshold value below a writing limit, for example.

When determining that the frequencies of writing into the nonvolatile semiconductor memory devices 31 are to be differentiated (A at Step S1), the mapping changing unit 16 proceeds to Step S2, to perform a process of differentiating the frequencies of writing into the nonvolatile semiconductor memory devices 31. Details of the process at Step S2 are explained later.

When determining that frequencies of writing into the nonvolatile semiconductor memory devices 31 are to be smoothed (C at Step S1), the mapping changing unit 16 proceeds to Step S3, to perform a process of smoothing the frequencies of writing into the nonvolatile semiconductor memory devices 31. Details of the process at Step S3 are explained later.

When determining that the frequencies of writing are to be kept unchanged (B at Step S1), the mapping changing unit 16 performs no process.

The processes above mentioned can be repeated if required.

The process of differentiating the frequencies of writing into the nonvolatile semiconductor memory devices 31 performed at Step S2 is explained in detail. Two methods of differentiating the writing frequencies are explained here as examples; however, the present embodiment is not limited to the explained methods.

In a first method of differentiating the writing frequencies, the writing frequencies are differentiated in a stepwise manner. As shown in FIGS. 11A to 11D, after an initial installation of the storage system (A), the number of accesses to each stripe block is measured for a certain period of time (B). The writing frequencies are then differentiated in a stepwise manner (the writing frequencies are slanted) based on results of the measurement to vary the numbers of writings (C). The writing frequencies are then smoothed, and occasional adjustment is performed to maintain a smoothed state (if necessary) (D). In this way, the nonvolatile semiconductor memory devices 31 reach the ends of their lives in turn.

Figure 12:
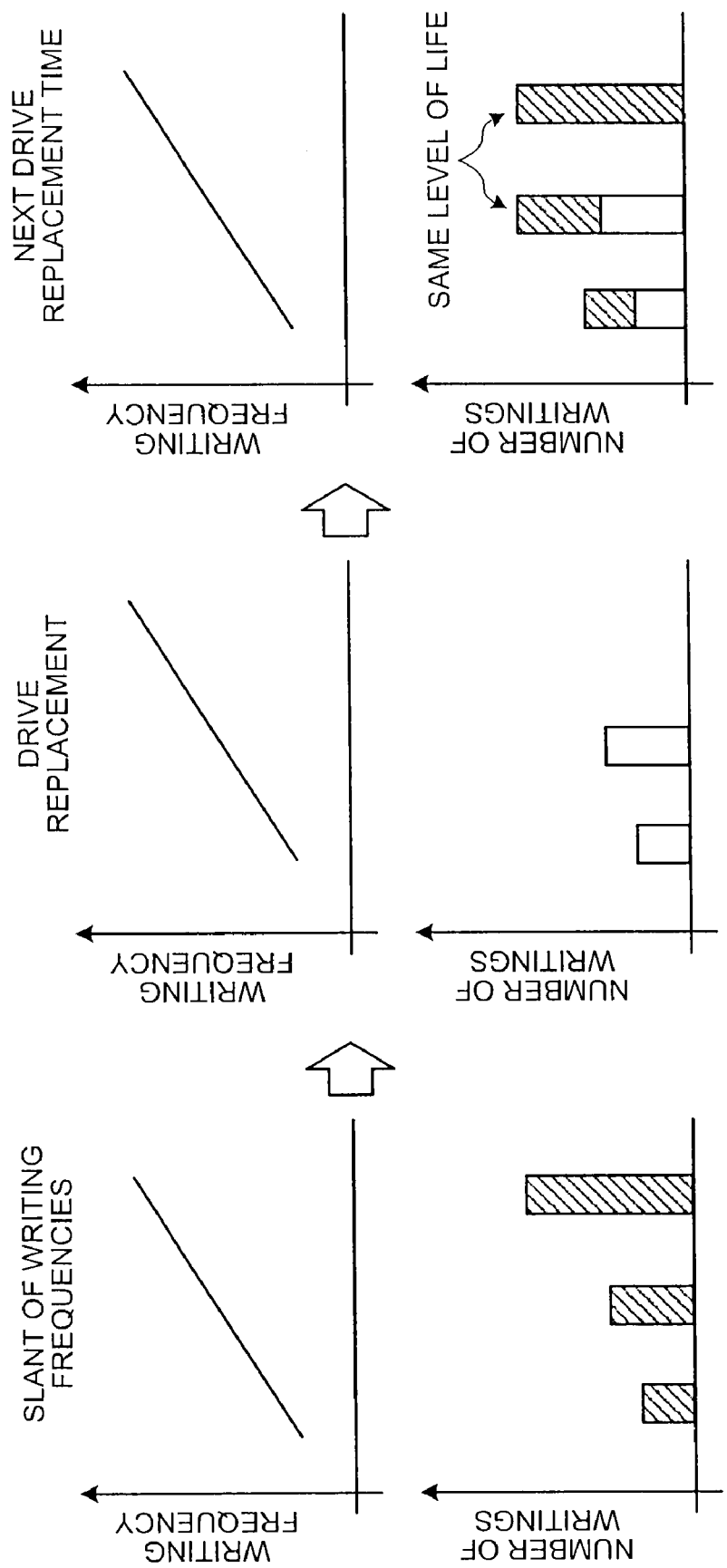
FIG. 12 is a schematic diagram for explaining a reason why the frequencies of writing the data into semiconductor memory devices are differentiated.

The reason why the writing frequencies are smoothed after the numbers of writings are varied is because some drives may have equivalent lifetimes at a future replacement time if the numbers of writings are kept varied even after the nonvolatile semiconductor memory devices 31 are replaced, as shown in FIG. 12.

Figure 13:
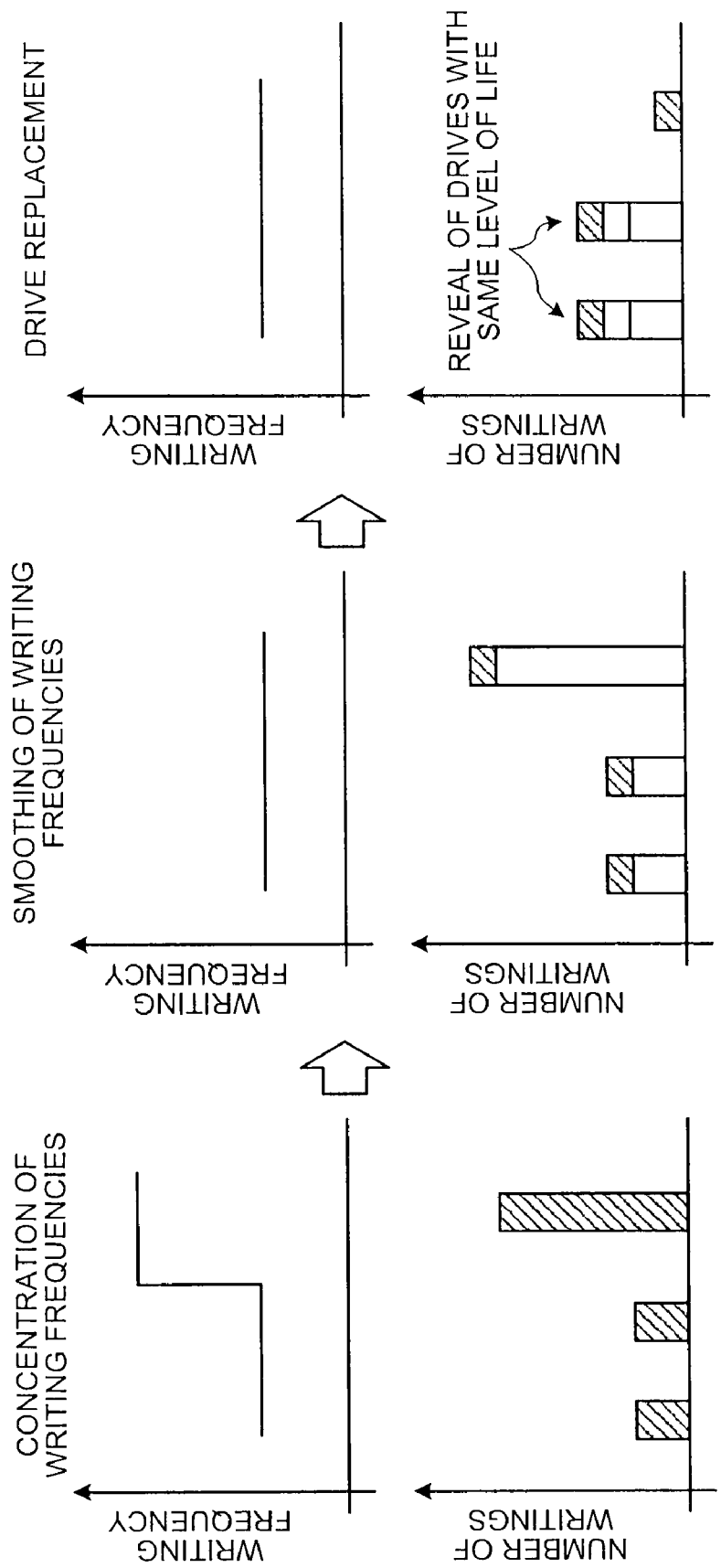
FIG. 13 is another schematic diagram for explaining the reason why the frequencies of writing the data into semiconductor memory devices are differentiated.

The reason why the writing frequencies are differentiated in a stepwise manner (the writing frequencies are slanted) is because drives having equivalent lifetimes are revealed after replacement of drives if the writing frequencies are differentiated so that the writing is highly concentrated into one drive, as shown in FIG. 13.

As shown in FIGS. 14A and 14B, in a second method of differentiating the writing frequencies, when a difference in life expectancy between top two drives having shorter life expectancies becomes lower than a predetermined threshold value (A), the frequencies of writing into the top two drives having shorter life expectancies are differentiated (B). In this case, it is effective that a higher writing frequency is allocated to a drive having a shorter life expectancy.

Figure 15:
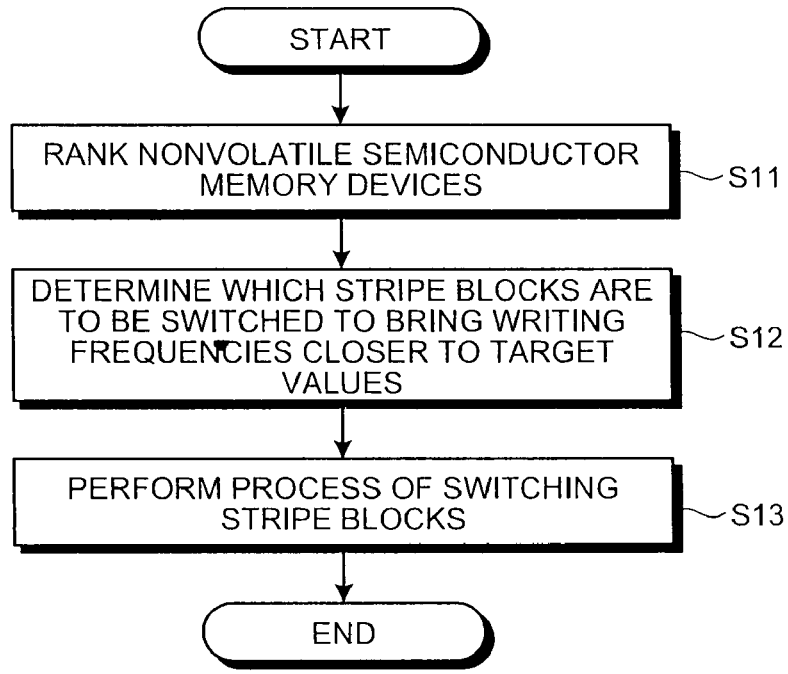
FIG. 15 is a flowchart of a process of differentiating the frequencies of writing into semiconductor memory devices.

FIG. 15 is a flowchart of the process of differentiating the frequencies of writing into the nonvolatile semiconductor memory devices 31 at Step S2 in FIG. 10. As shown in FIG. 15, the mapping changing unit 16 ranks the nonvolatile semiconductor memory devices 31 to determine how the writing frequencies are to be differentiated (Step S11). Methods of ranking the nonvolatile semiconductor memory devices 31 vary according to the method of differentiating the writing frequencies.

The mapping changing unit 16 then determines which stripe blocks are to be switched to bring the writing frequencies closer to target values, according to the method of differentiating the writing frequencies (Step S12). In some cases, it is determined that plural switchings of stripe blocks are to be performed as a result of the determination of the switching.

An appropriate result of the determination of the stripe block switching cannot be always obtained because there are following restrictions.

The storage system as represented by the RAID has fault tolerance and redundancy so that even when a specific memory device fails and data reading cannot be performed therefrom, data stored in the faulty memory device can be recovered from data stored in the other memory devices. Accordingly, it is necessary to maintain the redundancy also after the stripe blocks are switched.

Explanations are given with reference to the example shown in FIG. 2. As shown in FIG. 2, parity data of the parity block P1 is generated from the blocks A, B, and C. Therefore, a group of A, B, C, and P1 has redundancy (a group having redundancy is hereinafter referred to as "stripe group"). To achieve the fault tolerance, the blocks are stored in separate nonvolatile semiconductor memory devices 31 (drives). For example, even when two arbitrary stripe blocks including the parity block P1 are switched within the stripe group of A, B, C, and P1, the fault tolerance is kept because the blocks are stored in the separate nonvolatile semiconductor memory devices 31 (drives). Therefore, switching of stripe blocks within the stripe group is possible.

On the other hand, when the stripe blocks C and F are switched, this causes blocks that form the stripe group of A, B, C, and P1, and a stripe group of D, E, F, and P2 to be not stored in the separate nonvolatile semiconductor memory devices 31 (drives). Accordingly, the fault tolerance is lost, and thus there is a risk of data loss. Therefore, switching of stripe blocks across the stripe groups is impossible.

That is, the restrictions on the determination of the stripe block switching allow only switching within the same stripe group to keep a fault tolerant configuration. The stripe blocks in the same drive can be switched.

In the same stripe group, the number of writings of the parity block is the largest. Therefore, this leads the parity block to be assigned most to one of the nonvolatile semiconductor memory devices 31.

The mapping changing unit 16 then performs the process of switching stripe blocks by means of the switching unit 18 based on the result of the determination at Step S12 (Step S13). The switching process includes two processes, that is, a process of updating the information in the stripe mapping table shown in FIG. 7, and a process of switching the data stored in units of the stripe blocks. The switching process by the switching unit 18 is repeated by the number of times corresponding to the result of the determination.

Although not shown in the flowchart, when the process of switching the two stripe blocks is performed, an exclusive control is performed to ensure consistency when the command processing unit 12 starts the process at the same time, for example.

A specific example of the process of switching the data stored in units of the stripe blocks is explained. A method of switching the data stored in units of the stripe blocks is not limited to an example explained here. Targets to be switched are stripe blocks within the stripe group, and therefore there is no need to update parity data within the stripe block.

Figure 16:
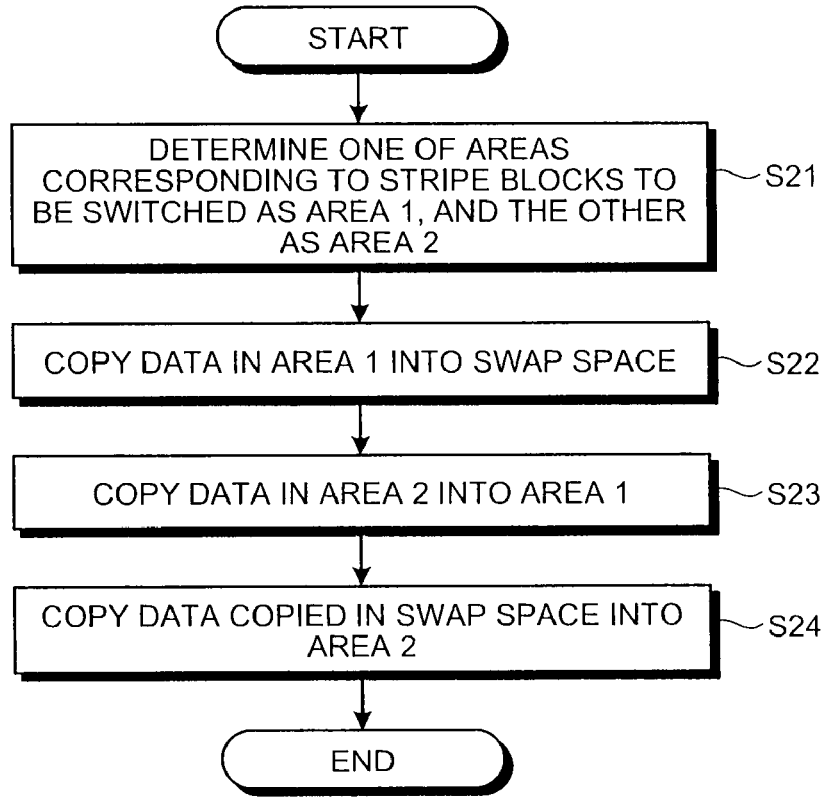
FIG. 16 is a flowchart of a switching process using a swap space.
Figure 17:
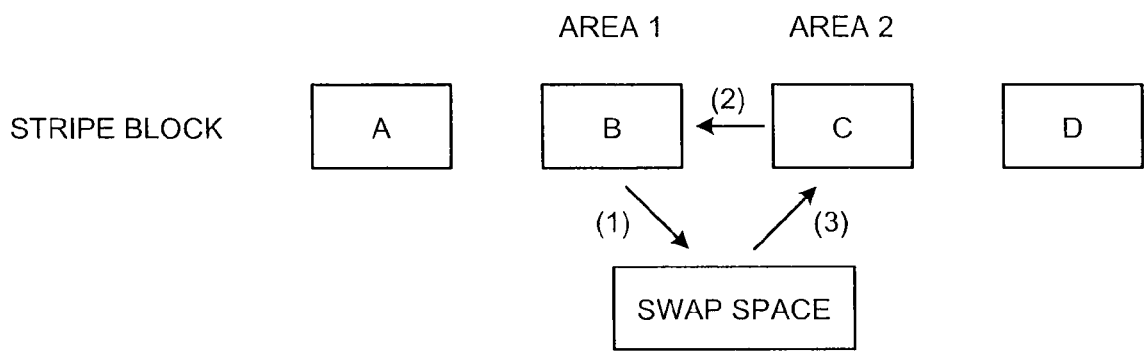
FIG. 17 is a schematic diagram for explaining the switching process.

In a first method to be used in the process of switching the data stored in units of the stripe blocks, a swap space is utilized. FIG. 16 is a flowchart of a switching process using a swap space, and FIG. 17 is a schematic diagram for explaining the switching process using a swap space. As shown in FIG. 16, the switching unit 18 first determines one of two areas corresponding to the stripe blocks to be switched as an area 1, and the other one as an area 2 (Step S21).

The switching unit 18 then copies data in the area 1 into a swap space (Step S22) as shown by (1) in FIG. 17, and then copies data in the area 2 into the area 1 as shown by (2) in FIG. 17 (Step S23).

The switching unit 18 finally copies the data copied in the swap space into the area 2 as shown by (3) in FIG. 17 (Step S24).

Figure 18:
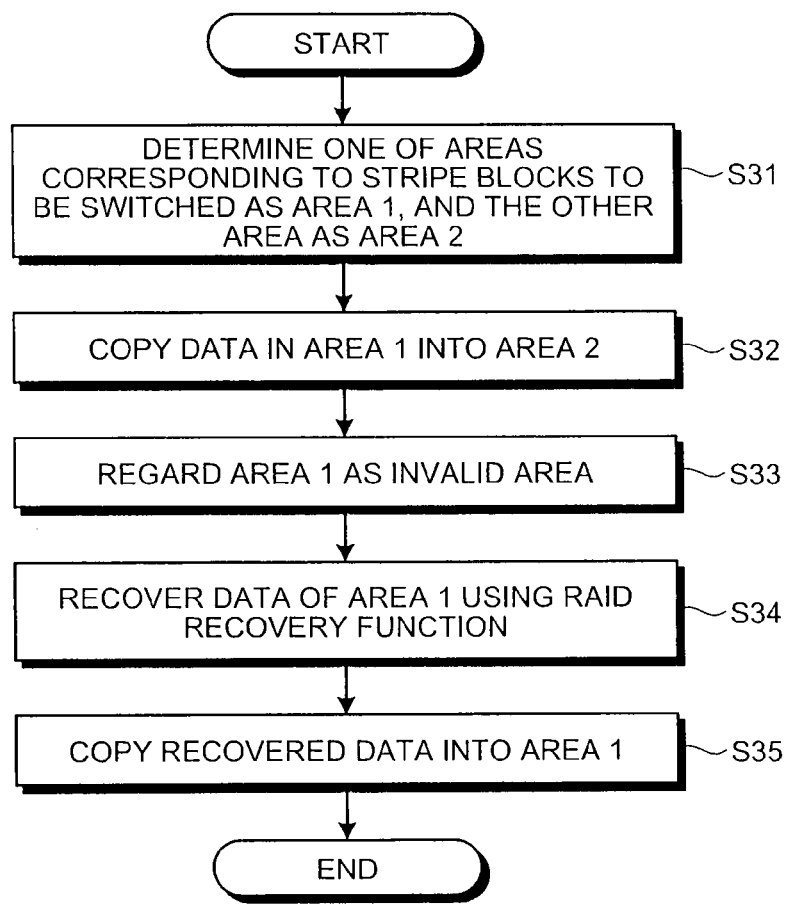
FIG. 18 is a flowchart of a switching process using a recovery function of the RAID.
Figure 19:
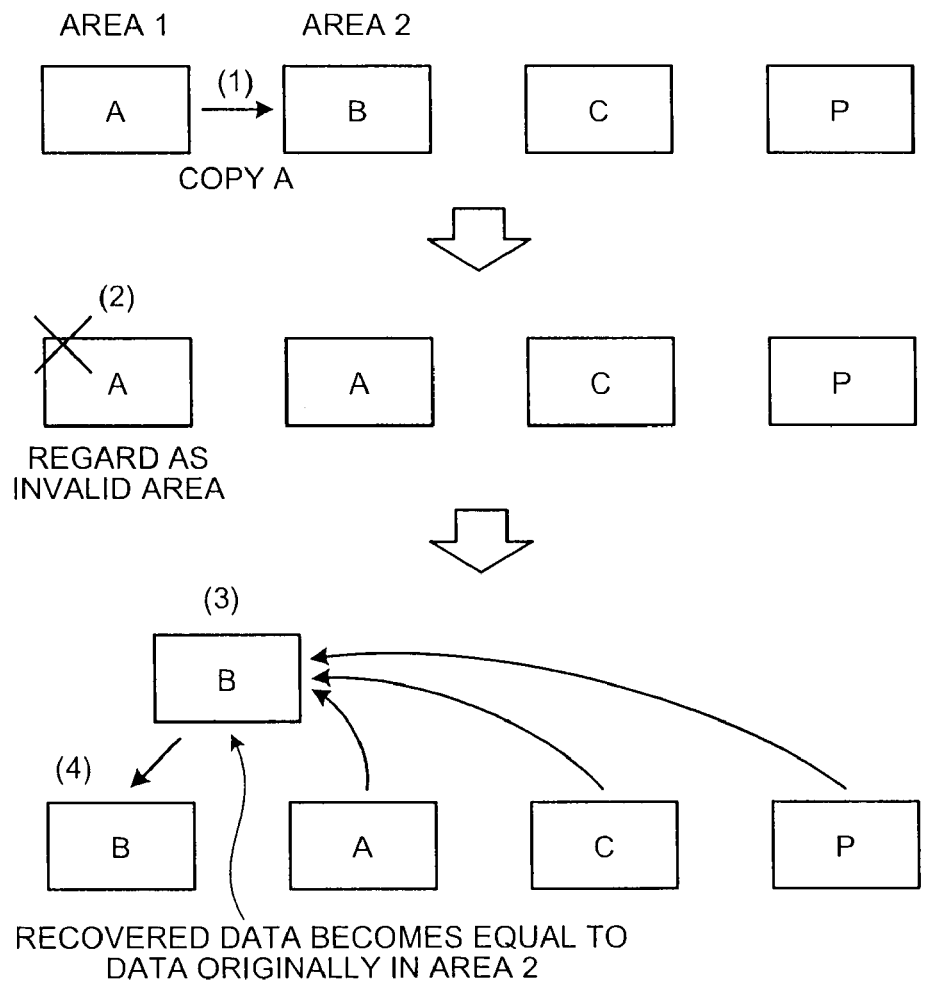
FIG. 19 is a schematic diagram for explaining the switching process.

In a second method to be used in the process of switching the data stored in units of the stripe blocks, a recovery function of the RAID is utilized. FIG. 18 is a flowchart of a switching process using the recovery function of the RAID, and FIG. 19 is a schematic diagram for explaining the switching process using the recovery function of the RAID. As shown in FIG. 18, the switching unit 18 first determines one of areas corresponding to two stripe blocks to be switched as an area 1, and the other area as an area 2 (Step S31).

The switching unit 18 then copies data in the area 1 into the area 2 (Step S32) as shown by (1) in FIG. 19. The switching unit 18 then regards the area 1 as an invalid area (Step S33) as shown by (2) in FIG. 19, and then recovers data of the area 1 by using the recovery function of the RAID included in the RAID controller 30 (Step S34) as shown by (3) in FIG. 19. The recovered data becomes the same as that originally stored in the area 2.

The switching unit 18 finally copies the recovered data into the area 1 (Step S35) as shown by (4) in FIG. 19.

The process of smoothing the frequencies of writing into the nonvolatile semiconductor memory devices 31 at Step S3 in FIG. 10 is explained next in detail.

Figure 20:
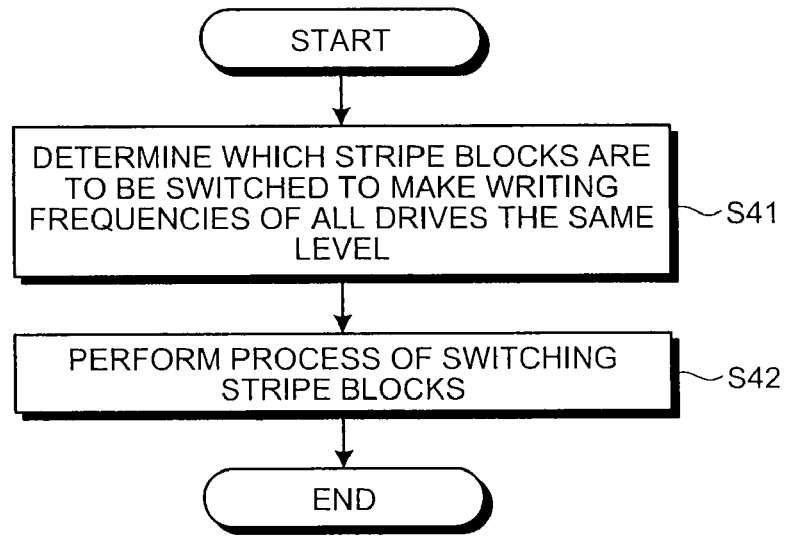
FIG. 20 is a flowchart of a process of smoothing the writing frequencies of semiconductor memory devices.

FIG. 20 is a flowchart of the process of smoothing the writing frequencies of the nonvolatile semiconductor memory devices 31 at Step S3. As shown in FIG. 20, the mapping changing unit 16 determines which stripe blocks are to be switched to make the writing frequencies of all the nonvolatile semiconductor memory devices 31 the same level (Step S41). In some cases, it is determined that plural switchings of stripe blocks are to be performed as a result of the switching determination. Because there are the restrictions above mentioned in the determination on the stripe block switching, the obtained result cannot always be appropriate.

The mapping changing unit 16 then performs the process of switching the stripe blocks by means of the switching unit 18 based on the result of the determination at Step S41 (Step S42). Like the process of differentiating the writing frequencies above mentioned, the switching process includes two processes, that is, the process of updating the information in the stripe mapping table as shown in FIG. 7, and the process of switching the data stored in units of the stripe blocks. The switching process by the switching unit 18 is repeated by the number of times corresponding to the result of the determination. Because the process of switching the data stored in units of the stripe blocks is explained above, redundant explanations will be omitted.

According to the present embodiment, when the frequencies of writing the data into the plural nonvolatile semiconductor memory devices 31 are determined to be differentiated, data of stripe blocks managed by the mapping table that contains the information about arrangement of the data and error correcting code data associated with the corrupted-data recovering function of recording the data and the error correcting code data to be distributed and stored in units of stripe blocks in the plural nonvolatile semiconductor memory devices 31, are switched to change the arrangement information, thereby differentiating the frequencies of writing the data into the plural nonvolatile semiconductor memory devices 31. Accordingly, the number of writings into a stripe block in which the error correcting code data is to be written (parity block) becomes the largest in the same stripe group, for example. Therefore, when more parity blocks are assigned to a desired one of the nonvolatile semiconductor memory devices 31, the frequencies of writing the data into the nonvolatile semiconductor memory devices 31 are differentiated. Consequently, it is possible to prevent the plural nonvolatile semiconductor memory devices 31 from failing around the same time, so that the risk of data loss can be reduced.

In the present embodiment, the number of writings in units of stripe blocks as shown in FIG. 8 is used as an example of the information to be used for calculating the writing frequency managed by the writing-frequency managing unit 14. A cache memory is commonly mounted on the storage system controller (RAID controller 30), and thus it can be considered that contents in the stripe block that is accessed with a high frequency are cached in the cache memory. Therefore, while accuracy may be reduced as compared to the case in which the number of writings is actually measured as shown in FIG. 8, it is possible to calculate the writing frequency in units of stripe blocks by referring to the information in the cache. Because the information is in the cache memory, there is no need for the writing-frequency managing unit 14 to include the table of measured numbers of writings in units of stripe blocks as shown in FIG. 8.

In the present embodiment, the number of writings into the nonvolatile semiconductor memory device 31 (drive) as shown in FIG. 9 is used as an example of the information to be used for calculating the life information managed by the life-information managing unit 15. When information about the number of remaining possible writings can be obtained from the nonvolatile semiconductor memory device 31 (drive), such information can be utilized alternatively. When information required for calculating the residual life can be obtained directly from the nonvolatile semiconductor memory device 31 (drive) as mentioned above, there is no need to provide the life information table.

When information about an upper limit of the number of possible writings into each of the nonvolatile semiconductor memory devices 31 (drives) can be obtained, it is possible to calculate the remaining number of possible writings by measuring the number of writings into each of the nonvolatile semiconductor memory devices 31 (drives), so that the life information can be obtained. In this case, the upper limit of the number of possible writings into each of the nonvolatile semiconductor memory devices 31 (drives) can be manually inputted, or the information can be automatically obtained and inputted.

In the present embodiment, while the RAID controller 30 in the storage system configured by the RAID is assumed as the data control apparatus, a computer system having such a function can be used instead of a dedicated storage system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data control apparatus comprising:
a mapping-table managing unit that manages a mapping table that is contained arrangement information of data and error correcting code data as redundant data that is given separately from the data, distributed and stored in units of stripe blocks in a plurality of nonvolatile semiconductor memory devices;
a determining unit that determines whether to differentiate frequencies of writing the data into the semiconductor memory devices; and
a changing unit that changes the arrangement information by switching the data stored in units of the stripe blocks managed using the mapping table to differentiate the frequencies of writing the data into the semiconductor memory devices, when the determining unit determines that the frequencies of writing the data into the semiconductor memory devices are to be differentiated, wherein
when a difference in life expectancy between top two of the semiconductor memory devices having shorter life expectancies becomes lower than a predetermined threshold value, the changing unit changes the arrangement information by switching the data stored in units of the stripe blocks managed using the mapping table to differentiate the frequencies of writing into the top two semiconductor memory devices having shorter life expectancies.

2. The apparatus according to claim 1, further comprising:
a writing-frequency managing unit that manages information about a frequency of writing of each of the stripe blocks; and
a life-information managing unit that manages information about residual lives of the semiconductor memory devices, wherein
the determining unit determines whether to differentiate the frequencies of writing the data into the semiconductor memory devices, based on the information about the frequency of writing of each of the stripe blocks, the information about the residual lives of the semiconductor memory devices, and information about the frequencies of writing into the semiconductor memory devices that can be calculated from the mapping table and the information about the frequency of writing of each of the stripe blocks.

3. The apparatus according to claim 1, wherein the changing unit changes the arrangement information by switching the data stored in units of the stripe blocks managed using the mapping table, and switches the data stored in units of the stripe blocks, to differentiate the frequencies of writing the data into the semiconductor memory devices in a stepwise manner.

4. The apparatus according to claim 3, wherein the changing unit changes the arrangement information by switching the data stored in units of the stripe blocks managed using the mapping table to smooth the frequencies of writing the data into the semiconductor memory devices, when a certain period of time has elapsed since the frequencies of writing the data into the semiconductor memory devices are differentiated.

5. The apparatus according to claim 1, wherein the changing unit allocates a higher writing frequency to the semiconductor memory device having a shorter life expectancy.

6. The apparatus according to claim 1, wherein the changing unit only allows switching within one and a same stripe group to maintain a fault tolerant configuration as restrictions of a determination of stripe block switching.

7. The apparatus according to claim 1, wherein the changing unit only allows switching of the stripe blocks within one and a same semiconductor memory device to maintain a fault tolerant configuration as restrictions of a determination of stripe block switching.

8. The apparatus according to claim 1, wherein the changing unit uses a swap space in the switching of data stored in units of the stripe blocks.

9. The apparatus according to claim 1 wherein the changing unit uses a recovery function of redundant arrays of independent/inexpensive disks (RAID) in the switching of data stored in units in the stripe blocks.

10. A storage system comprising:
a plurality of nonvolatile semiconductor memory devices; and
the data control apparatus according to one of claims 1 to 4 and 5 to 9.

11. A non-transitory computer readable medium storing computer readable instructions thereon for controlling data that when executed by a computer cause the computer to perform a method comprising:
managing a mapping table that is contained arrangement information of data and error correcting code data as redundant data that is given separately from the data, distributed and stored in units of stripe blocks in a plurality of nonvolatile semiconductor memory devices;
determining whether to differentiate frequencies of writing the data into the semiconductor memory devices; and
changing the arrangement information by switching the data stored in units of the stripe blocks managed using the mapping table to differentiate the frequencies of writing the data into the semiconductor memory devices, when it is determined that the frequencies of writing the data into the semiconductor memory devices are to be differentiated, wherein
when a difference in life expectancy between top two of the semiconductor memory devices having shorter life expectancies becomes lower than a predetermined threshold value, the changing the arrangement information is performed by switching the data stored in units of the stripe blocks managed using the mapping table to differentiate the frequencies of writing into the top two semiconductor memory devices having shorter life expectancies.

12. A method for controlling data, comprising:
managing a mapping table that is contained arrangement information of data and error correcting code data as redundant data that is given separately from the data, distributed and stored in units of stripe blocks in a plurality of nonvolatile semiconductor memory devices;
determining whether to differentiate frequencies of writing the data into the semiconductor memory devices; and
changing the arrangement information by switching the data stored in units of the stripe blocks managed using the mapping table to differentiate the frequencies of writing the data into the semiconductor memory devices, when it is determined that the frequencies of writing the data into the semiconductor memory devices are to be differentiated, wherein
when a difference in life expectancy between top two of the semiconductor memory devices having shorter life expectancies becomes lower than a predetermined threshold value, the changing the arrangement information is performed by switching the data stored in units of the stripe blocks managed using the mapping table to differentiate the frequencies of writing into the top two semiconductor memory devices having shorter life expectancies.

* * * * *